United States Patent [19]

Newland et al.

[11] 4,112,182

[45] Sep. 5, 1978

[54] PLASTIC MOLDINGS AND SHEETING

[75] Inventors: Gordon C. Newland; James G. Pacifici, both of Kingsport, Tenn.

[73] Assignee: Eastman Kodak Company, Rochester, N.Y.

[21] Appl. No.: 784,395

[22] Filed: Apr. 4, 1977

[51] Int. Cl.² .................... B32B 27/30; B32B 27/16
[52] U.S. Cl. .................... 428/336; 428/339; 428/409; 428/510; 428/911
[58] Field of Search ............ 428/500, 507, 510, 522, 428/911, 409, 339, 334–336

[56] References Cited

U.S. PATENT DOCUMENTS

| | | | |
|---|---|---|---|
| 3,549,510 | 12/1970 | Casalina | 428/507 X |
| 3,968,306 | 7/1976 | Yoshihara et al. | 428/500 X |
| 4,005,244 | 1/1977 | Wismer et al. | 428/500 X |
| 4,049,869 | 9/1977 | Delong | 428/522 X |

*Primary Examiner*—Harold Ansher
*Attorney, Agent, or Firm*—Donald W. Spurrell; Daniel B. Reece, III

[57] ABSTRACT

Plastic sheeting and other formed plastic articles, particularly of cellulose ester, having an improved overall balance of physical properties such as impact strength, solvent resistance, surface hardness and surface appearance are obtained by applying radiation curable compositions containing certain unsaturated cellulose ester materials to one or more surfaces of the articles and radiation curing the same.

6 Claims, No Drawings

PLASTIC MOLDINGS AND SHEETING

This invention concerns improvements in the physical properties of formed plastic articles such as sheeting and moldings, especially regarding the overall balance of physical properties including impact strength, solvent resistance, and surface hardness and appearance. More particularly the invention concerns applying compositions containing certain unsaturated cellulose esters to one or more surfaces of formed articles such as skylight domes, window panels, thermometer faces and the like, of commercial grade sheeting or molding cellulosics such as celulose acetate butyrate and cellulose acetate propionate, and curing the coating with radiation.

The invention may be defined in its broad sense as comprising coating compositions of cellulose esters which have been chemically modified to contain reactable ethylenically unsaturated carboxylate moieties, which esters are admixed with other ethylenically unsaturated monomeric material such as acrylate and methacrylate monomers, coated onto formed plastic articles and cured by radiation such as electron beam, gamma, or ultraviolet radiation, the latter in the presence of photoinitiators, to impart improved chemical and physical properties to said articles.

A more specific embodiment of the invention comprises formed cellulose ester articles having surface portions coated with a radiation-curable composition comprising ethylenically unsaturated cellulose ester wherein the average degree of unsaturation (number of curable double bonds) per anhydroglucose unit (AGU) is from 0.1 to less than 3.0, preferably from 0.1 to 2.0, admixed with at least one ethylenically unsaturated comonomer, the ratio of said cellulose ester to said comonomer in parts by weight being from about 1/20 to about 20/1, with from about 1/2 to about 10/1 being preferred. The invention also encompasses, of course, the cured coated articles.

The radiation-curable coating compositions of this invention comprise, more specifically, cellulose ester such as cellulose acetate-propionate modified with $\alpha,\beta$-unsaturated carboxylate moiety, in admixture primarily with $\alpha,\beta$-unsaturated carboxylate monomer. The typical modified cellulose esters useful in this invention have inherent viscosities (I.V.) of from about 0.01 to about 2.0, as determined by ASTM D-2857-70 using 0.25 gram of cellulose ester in 100 ml. of acetone at 25° C. They contain an average of from 0.1 to less than 3.0, preferably from 0.1 up to 2.0, of each of saturated and $\alpha,\beta$-unsaturated carboxylate groups per anhydroglucose unit (AGU) which has the established formula

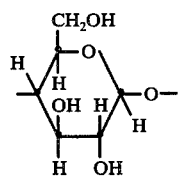

The degree of esterification of the cellulose may be such that free hydroxyl groups are also present in concentrations which average up to about 1.0 hydroxyl per AGU, with lower amounts being more typical. The percent hydroxyl present may be determined readily from the carbanilate group content according to ASTM D-817-65. It is apparent that the sum of the above saturated, unsaturated, and free hydroxyl group per AGU will in all cases essentially equal 3. Typical unsaturated carboxylate groups with which the cellulose ester is modified are acrylate, methacrylate, and crotonate. The saturated carboxylate groups are selected from acetate, propionate, butyrate, and mixtures such as acetate-butyrate, acetate-propionate, and acetate-arylate such as acetate-benzoate.

The unsaturated cellulose esters are conveniently prepared by standard esterification reactions of ordinary cellulose or partially back hydrolyzed cellulose esters, e.g., cellulose acetate. The useful cellulosic material is characterized as having three hydroxyl sites, rather than highly degraded material which may have substantial chain-end hydroxyls. These curable celulose estes are dispersed or dissolved in the $\alpha,\beta$-unsaturated carboxylic acid ester comonomer with or without other comonomers at a concentration dependent upon molecular weight of the unsaturated cellulose ester, chemical structure of the comonomer, desired application viscosity, and other properties important to the intended end use.

The $\alpha,\beta$-unsaturated carboxylate comonomers, preferably acrylates and methacrylates, can be those derived from monohydric and polyhydric alcohols. Typical acrylates are methyl acrylate, butyl acrylate, 2-methoxyethyl acrylate, 2-hydroxyethyl acrylate, 2-hydroxypropyl acrylate, ethyleneglycol diacrylate, neopentyl glycol diacrylate, triethyleneglycol diacrylate, and trimethylol propane triacrylate. The preferred acrylates are the hydroxyethyl and hydroxypropyl derivatives which can be prepared easily from the reaction of ethyleneoxide or propyleneoxide with acrylic acid. These comonomers may be used in combination with other mono- and polyfunctional unsaturated carboxylates, and other ethylenically unsaturated comonomers such as acrylonitrile, styrene and the like. The usable amount of such comonomers will depend largely on their compatibility with other components in the system. Likewise, other reactive oligomers such as acrylate capped polyurethanes, low molecular weight polyepoxides, and carboxy terminated polyesters, and nonreactive conventional cellulose esters including cellulose nitrate can be used in the coatings.

Exemplary of particularly useful and highly preferred unsaturated cellulose esters are the cellulose propionate crotonates prepared by esterifying partially back hydrolyzed cellulose acetate with crotonic anhydride, or by direct esterification of cellulose with a mixture of propionic and crotonic anhydrides. These esters are solids typically but not necessarily having a softening point of from about 213° C. to about 250° C., I.V. of from about 0.25 to about 1.5, average crotonyl content of from about 15% to about 40%, total saturated ester group content of from about 20% to about 40%, and free hydroxyl content of from about 0.1% to about 2.5%. These ester group percentages are by weight based on total weight of the cellulose ester sample, and may be determined for the various ester groups by the following procedure.

The mixed ester sample is saponified using sodium hydroxide, phosphoric acid catalyst and heat. The resulting mixture is vacuum distilled to yield an aqueous solution of the free acids. The aqueous solution is partitioned with n-butyl acetate and the water layers are titrated with standard sodium hydroxide. The distribution ratios of acids in the mixture are determined from these titrations. The molar ratio of te acids are calculated from the partition coefficients for the pure acids between wate and n-butyl acetate and the distribution ratios of the acids in the sample mixture. The weight percent of each acyl group in the cellulose ester is calculated from the molar ratio and the apparent acetyl content of the sample. See ASTM D-817-72 for a detailed description of the procedure. In addition to infrared and NMR, a method for determining te unsaturated acyl moiety content within 1 to 2% accuracy, is as follows, using crotonyl as the example.

Reagents 1. *Pyridine Bromine Sulfate [Pryidinium Sulfate Dibromide* ($C_6H_5N.H_2SO_4.Br_2$)] — To a mixture of 8 g. of pyridine, 10 g. of concentrated sulfuric acid, and 20 ml. of acetic acid, add a solution of 8 g. of bromine dissolved in 20 ml. of acetic acid. Dilute to one liter with acetic acid.

2. Potassium Iodide Solution — Dissolve 10 g. of potassium iodide in 15 ml. of distilled water. Add 100 ml. of ethyl alcohol - methylene chloride mixture (3:2 by volume).

3. Standard 0.1N Sodium Thiosulfate.

4. Starch Indicator Solution.

The photoinitiators used in conjunction with U.V. light are incorporated in the coating compositions in amounts of from about 1 to about 25% by weight and preferably from about 2 to about 15% by weight of the total composition weight. Typical photoinitiators applicable to these systems are benzoin methyl and ethyl ethers, desylbromide, desylchloride, halomethyl ketones, aromatic substituted aliphatic ketones, aromatic ketones in combination with amines, $\alpha\alpha$-diethoxyacetophenone and 2-chlorothioxanthone. The coating compositions are exposed to radiation such as ultraviolet light from mercury vapor lamps in air or in nitrogen to give a cured finish. Various methods for irradiating the curable coatings are disclosed in the art such as U.S. Pat. Nos. 3,551,246 and 3,558,387.

The cellulose ester substrates to which the present invention is applicable include the typical molding and forming grade cellulose acetate propionates (CAP), cellulose acetate butyrates (CAB), and cellulose acetates exemplified in the following Table I which gives the more salient characteristics thereof. Such substrates may contain the usual colorants, plasticizers such as dioctylphthalate and dibutylazealate, stabilizers and other additives.

TABLE 1

| | Average Viscosity ASTM D-1343-69 (Formula A) | | Average Acyl Content % by Weight ASTM D-817-72 | | Average Hydroxyl Content, % by Wt. | Melting Range ° C | Tg, ° C. | Tukon Hardness ASTM D-1474-68 Knoops |
|---|---|---|---|---|---|---|---|---|
| | Seconds | Poises | Acetyl, | Butyryl, | | | | |
| Cellulose Acetate Butyrate | 1.0 | 3.8 | 2.8 | 50 | 2.0 | 135–150 | 115 | 9 |
| | 1.0 | 3.8 | 5.0 | 49 | 0.5 | 165–175 | 104 | 10 |
| | 5.0 | 19.0 | 5.0 | 49 | 0.9 | 165–175 | 96 | 10 |
| | 1.0 | 3.8 | 8.5 | 44 | 1.0 | 155–160 | 117 | 10 |
| | 2.0 | 7.6 | 13.0 | 37 | 1.5 | 171–184 | 133 | 12 |
| | 20.0 | 76.0 | 13.0 | 37 | 1.5 | 195–205 | 141 | 12 |
| | 3.0 | 11.4 | 20.5 | 26 | 2.7 | 205–215 | 154 | 13 |
| | 20.0 | 76.0 | 20.5 | 26 | 2.7 | 215–220 | 156 | 13 |
| | 2.0 | 7.6 | 29.5 | 17 | 1.5 | 230–240 | 150 | 16 |
| | 15.0 | 57.0 | 29.5 | 17 | 1.5 | 230–240 | 161 | 16 |
| | 25.0 | 95.0 | 29.5 | 17 | 1.5 | 230–240 | 162 | 16 |
| | 40.0 | 152.0 | 29.5 | 17 | 1.5 | 230–240 | 161 | 16 |
| | | | Acetyl | Propionyl | | | | |
| Cellulose Acetate Propionate | 20.0 | 76.0 | 2.5 | 46 | 2.8 | 188–210 | 147 | 13 |
| | | | Acetyl | | | | | |
| Cellulose Acetate | 40.0 | 152.0 | 38.3 | | 4.5 | 235–255 | 189 | 19 |
| | 30.0 | 114.0 | 39.4 | | 3.7 | 235–255 | 190 | 20 |
| | 45.0 | 171.0 | 39.4 | | 3.8 | 240–260 | 180 | 20 |
| | 60.0 | 228.0 | 39.4 | | 4.0 | 240–260 | 186 | 20 |
| | 3.0 | 11.4 | 39.8 | | 3.6 | 230–250 | 180 | 19 |
| | 6.0 | 22.8 | 39.8 | | 3.7 | 230–250 | 185 | 19 |
| | 10.0 | 38.0 | 39.8 | | 3.4 | 230–250 | 182 | 19 |
| | 25.0 | 95.0 | 39.9 | | 3.2 | 240–260 | 184 | 20 |

Procedure

Accurately weigh a 0.1- to 0.3-g. sample, dried in a vacuum oven at 50°–60° C. for 2 hr., into a 125-ml., glass-stoppered Erlenmeyer flask. Pipet in exactly 25 ml. of pyridine bromine sulfate solution, stopper and heat in a 60° C. oven overnight. Cool the sample and add 10 ml. of potassium iodide solution. Titrate with 0.1N sodium thiosulfate solution until the iodine color is nearly disipated; add 5 ml. of starch indicator and continue the titration to a colorless end point. Run a blank in parallel.

Calculation

Percent Crotonyl =

$$\frac{\left(\frac{\text{ml. Na}_2\text{S}_2\text{O}_3}{\text{for blank}} - \frac{\text{ml. Na}_2\text{S}_2\text{O}_3}{\text{for sample}}\right) \times N_{Na_2S_2O_3} \times 3.45}{\text{Sample Wt.}}$$

The molded and sheeted articles of this invention may be coated with the radiation curable composition by conventional coating equipment and the coating then exposed to radiation. The coating is typically applied at thicknesses of from about 0.1 to about 5 mils or more depending on the desired end use; however, thicknesses of approximately 1 mil are preferred for most uses.

The following Examples 1 and 2 wherein percentages are by weight illustrate the preparation of curable, unsaturated cellulose esters.

EXAMPLE 1

A cellulose propionate crotonate (CPC) is prepared as follows:

A cellulose ester sample averaging 1.5% acetyl, 39.0% propionyl, and 6.9% hydroxyl groups, with an I.V. of 1.5 is reacted in pyridine solution with crotonyl chloride for 3 hours at reflux. The reaction system, after cooling to room temperature, is added slowly to water and the precipitated product (CPC) collected by filtration, washed with 10% aqueous solution bicarbonate, then washed under a continuous stream of water for 1 hour, and then dried overnight under vacuum. The product has an I.V. of 1.2, and shows a crotonyl content of 26.8% by infrared and proton NMR analyses.

EXAMPLE 2

A cellulose butyrate acrylate (CBA) is prepared as follows:

A 2.5 g cellulose ester sample averaging 2.0% acetyl, 45.0% butyryl, and 4.5% hydroxyl groups, is dissolved in 250 ml. of acetone contaning 1 g. of pyridine. To this solution is added 15 g. of acrylic anhydride and the reaction system stirred overnight at room temperature. The reaction system is poured slowly into water and the precipitated product (CBA) collected by filtration, washed with 10% aqueous sodium bicarbonate, then washed under a continuous stream of water for 1 hour, and then dried overnight under vacuum. Infrared and proton NMR analyses show the presence of 10% acrylate groups, and the product has an I.V. of 0.5.

EXAMPLE 3

Plaques, 4½- × 4½- × ¼-inches, were made of the composition comprising 100 parts by weight of commercial grade CAB contaning about 38% butyryl and having a falling bal viscosity (ASTM D-1343-69) of 20 sec., 6.2 parts of dibutyl azelate and 2.0 parts of resorcinol monobenzoate. The plaques were coated to a thickness of about 1.5 mils with a series of U.V. curable coatings and curing was accomplished by exposure to a Gates 420U11B mercury lamp (80 watts per inch) for 5 minutes. These plaques were subjected to a falling weight impact test, ASTM D-3029-72, Procedure B, and their impact strengths are shown in Table 2. As seen from the data, the previously available ultraviolet-curable coatings reduced the impact strength of the substrate to an unacceptable level, while the coatings of this invention containing cellulose propionate crotonate reduced the impact strength of the substrate only an acceptable amount while imparting the desired surface properties to the substrate.

| U.V. Curable Coating Composition Parts by Weight | Impact Strength, Ft-Lb |
|---|---|
| None (uncoated CAB of Example 3) | 20.5 |
| 77 Hetron 520 (polyester of maleic anhydride and propylene glycol) 19.2 Styrene 3.8 Isobutyl benzoin ether | 1.4 |
| Lilly Industrial Coating 110-111 (polyester) | 0.4 |
| Lilly Industrial Coating 1130 (polyurethane) | 0.4 |
| 82 2-Hydroxyethyl acrylate 14 CPC of Example 1 4 Isobutyl benzoin ether | 13.9 |
| 64 2-Methyoxyethyl acrylate 16 CPC of Example 1 8 Acrylonitrile 8 Neopentyl glycol diacrylate 4 Isobutyl benzoin ether | 14.5 |

EXAMPLE 4

Plaques, 4- × 4- × ¼-inches of the CAB composition of Example 3 were coated to a thickness of about 1.5 mils with an ultraviolet-curable coating consisting, in parts by weight, of 12 parts cellulose propionate crotonate (I.V. = 1.04), 5 parts neopentyl glycol diacrylate, 83 parts 2-hydroxyethyl acrylate and 2 parts of each of a series of photoinitiators. The coatings were cured for one minute with the aforesaid Gates lamp and the impact strenghts of the plaques measured as in Example 3. As shown by Table 3, the coatings containing CPC are effectively cured with a variety of photoninitiators which do not reduce unacceptably, the impact strength of the substrate.

TABLE 3

| Photoinitiator | Impact Strength, Ft-Lb |
|---|---|
| none | 20.0 |
| $C_3H_7-OC(O)-C_6H_4-C(O)-CH(OC_3H_7)-C_6H_4-C(O)-OC_3H_7$ | 17.1 |
| $ClCH_2-C_6H_4-C(O)-C_6H_4-C(O)-C_6H_4-CH_2Cl$ | 17.4 |
| $C_6H_5-C(O)-CH(OC_4H_9)-C_6H_5$ | 19.0 |
| $ClCH_2-C_6H_4-C(O)-C_6H_4-CH_2Cl$ | 16.8 |
| $C_6H_5-C(O)-S-C_6H_4-CH_3$ | 17.0 |
| benzoxazole-$C_6H_4-CH_2Cl$ 1:1 Mixture | 14.6 |
| $ClCH_2-C_6H_4-C(O)-C_6H_4-CH_2Cl$ / $C_6H_5-C(O)-S-C_6H_4-CH_3$ | 16.7 |

EXAMPLE 5

Plaques, 4½× 4½-× ¼-inches, molded from Plexiglas acrylic molding material were coated to a thickness of about 1.5 mils with ultraviolet-curable coatings. The coatings were subsequently cured with the aforesaid Gates lamp for 1 minute. The impact strengths of the coated plaques were determined as in Example 3. The data in Table 4 illustrates the uniqueness of the cellulose ester substrate in the present invention in that the CPC coatings do not enhance the impact properties of the Plexiglas acrylic substrate, and being softer than the substrate, do not add any desirable surface properties.

TABLE 4

| No. | Composition | Impact Strength Ft-Lb |
|---|---|---|
| 1 | None | 0.4 |
| 2 | 72.1% Hydroxyethyl acrylate 25.6% CPC of Example 1 2.3% Isopropyl benzoin ether | 0.3 |
| 3 | 67.2% Hydroxyethyl acrylate 23.9% CPC of Example 1 6.7% Pentaerythritol triacrylate 2.2% Isopropyl benzoin ether | 0.3 |

EXAMPLE 6

Plaques of the CAB composition of Example 3 were coated to a thickness of about 2 mils with ultraviolet-curable coatings and cured by exposure of 1 minute to the aforesaid Gates lamp. Pencil hardness (ASTM D-3363-74) and impact tests of Example 3 were conducted and the results shown in Table 5. The coatings containing CPC gave enhanced surface hardness while retaining acceptable impact strength.

TABLE 5

| Coating Composition In Parts by Weight | Pencil Hardness | Impact Strength, Ft-Lb |
| --- | --- | --- |
| None (Uncoated CAB of Example 3) | B | 12.3 |
| 14.9 CPC of Example 1 | H | 13.2 |
| 59.7 2-Methoxyethyl acrylate | | |
| 21.6 Neopentyl glycol diacrylate | | |
| 3.2 Isobutyl benzoin ether | | |
| 15.0 CPC of Example 1 | F | 14.3 |
| 5.2% Neopentyl glycol diacrylate | | |
| 75.8 2-Methoxyethyl acrylate | | |
| 4.0 Isobutyl benzoin ether | | |
| 15 CPC of Example 1 | HB | 6.1 |
| 5 Neopentyl glycol diacrylate | | |
| 76 2-Hydroxyethyl acrylate | | |
| 4 Isobutyl benzoin ether | | |
| 96 2-Hydroxyethyl acrylate | 6B (poor) | 20.9 |
| 4 Isobutyl benzoin ether | | |

EXAMPLE 7

Samples of sheeting of the compostion of Example 3 were coated to a thickness of about 1.5 mils with a composition consisting of 15% CPC of Example 1, 8% neopentyl glycol diacrylate, and 77% hydroxyethyl acrylate. To these components was added about 4% by weight of 4,4'-bis(chloromethyl)benzophenone. The coatings were cured by irradiation with the aforesaid Gates lamp for 2 minutes and the samples then immersed in various chemicals for a period of 1 minute. The effects of the chemicals noted by such visual phenomenon as swelling, discoloration, softening, and solvation are summarized in Table 6. The cured coatings were vastly superior to the uncoated sheeting in solvent resistance.

TABLE 6

| Chemical | Uncoated | Coated |
| --- | --- | --- |
| Acetone | solvated | no effect |
| Methylene chloride | solvated | no effect |
| Ethyl acetate | solvated | no effect |
| Chloroform | solvated | slight craze |
| Ammonium hydroxide | no effect | no effect |
| Methyl alcohol | swells | no effect |
| Ethyl alcohol | swells | no effect |
| Sulfuric acid | attacks | attacks |
| Toluene | swells | no effect |
| Acetic acid | solvated | very slight |

TABLE 6-continued

| Chemical | Uncoated | Coated |
| --- | --- | --- |
| | | swelling |

The invention has been described in detail with particular reference to preferred embodiments thereof, but it will be understood that variations and modifications can be effected within the spirit and scope of the invention.

We claim:

1. A formed cellulose ester article having surface portions coated with a radiation-curable composition comprising ethylenically unsaturated cellulose ester wherein the average degree of saturation and unsaturation per anhydrogluclose unit is from 0.1 to less than 3.0 of each of the saturated and unsaturated moieties, in admixture with at least one $\alpha,\beta$-unsaturated carboxylate comonomer, the ratio in parts by weight of unsaturated cellulose ester to unsaturated comonomer being from 1/20 to 20/1.

2. The article of claim 1 wherein the ethylenically unsaturated cellulose ester is selected from esters wherein the unsturated moiety is acrylate, methacrylate or crotonate, the saturated moiety is selected from acetate, propionate, butyrate or mixtures thereof, wherein the average degree of unsaturation per anhydroglucose unit is from 0.1 to 2.0, and wherein the unsaturated carboxylate comonomer is selected from 2-hydroxyethylacrylate, 2-methoxyethylacrylate, 2-hydroxyethylmethacrylate, 2-methoxyethylmethacrylate, 2-hydroxypropylcrylate, butyl acrylate and 2-ethylhexylacrylate, the ratio in parts by weight of unsaturated cellulose ester to unsaturated comonomer being from about 1/2 to 10/1.

3. The article of claim 1 wherein the composition contains from about 1 to about 25% by weight of a photoinitiator.

4. The composition of claim 2 wherein the composition contains from 2.0 to 15.0% by weight of a photoinitiator.

5. The article of claim 1 in the form of a sheet, and the coating being from about 0.5 to about 5.0 mils in thickness.

6. The article of claim 5 wherein the sheet is selected from cellulose acetate butyrate and cellulose acetate propionate.

* * * * *